Aug. 15, 1944.   L. C. STEINLE ET AL   2,356,098
THREADED ELEMENT
Filed Feb. 15, 1943   3 Sheets-Sheet 2

Inventors
L. C. Steinle
C. H. Hanwell
By Glascock Downing Subtle
Attys

Patented Aug. 15, 1944

2,356,098

UNITED STATES PATENT OFFICE 2,356,098

THREADED ELEMENT

Leo Caspar Steinle, Wimbledon, London, and Cedric Harold Hanwell, Cogenhoe, England Application February 15, 1943, Serial No. 475,995
In Great Britain December 29, 1942

4 Claims. (Cl. 151—32)

This invention relates to externally threaded elements, such as studs or bolts. It will be described herein mainly with reference to studs. Studs are largely used among other instances in connection with engine crank cases, and frequently these crank cases are made of material very much softer than the studs, namely, aluminium or some light metal alloy. To some extent there is a tendency for a certain amount of loosening of the studs to take place under vibration or some or other of the kind of stresses met with in the use of crank cases, say, for aeroplanes.

Further, there is always the question whether the stresses are taken uniformly or to the best advantage by the whole of the threads, and indeed by the stud itself.

Again, the act of screwing a stud into position is one which in effect may be regarded as corresponding to the entering threads acting as a kind of finishing tap, leaving the remainder of the threads to follow without being able to exert much pressure against the threads of the stud hole. Whatever may be the theory, it is the case in practice that studs are often found somewhat loose, which is disadvantageous when nuts have to be removed from them, sometimes making it difficult to remove the nut without the stud. The position becomes worse when a stud has to be replaced, for each time there is a tendency for the stud hole to be slightly increased, or the thread to be enlarged, giving slackness in the fitting.

In practice, for these reasons stud threads are often made somewhat oversize with respect to the true thread, or with respect to the nut end of the stud, if both nut and crank case ends are both of the same nominal diameter, pitch and so on.

The object of the present invention is to provide a thread form overcoming or minimising the above indicated disadvantages applicable to studs, bolts and other externally threaded objects.

The invention consists in a threaded stud or bolt or the like, in which the thread is continuously or in two or more stages modified at different parts, for instance, by changing the pitch of the thread, or alternatively, by changing the position of the start of the thread on different parts of the stud, bolt or the like, the various stages being connected so that the thread as a whole preferably forms a continuous thread.

The invention also consists in threaded studs, bolts or the like in accordance with the preceding paragraph, constructed substantially as herein described.

Referring to the accompanying diagrammatic drawings—

Figures 2–5 illustrate an alternative form or modification in which Figures 2–4 are given for explanatory purposes and Figure 5 illustrates a finished thread, Figure 2 representing a transparent cylinder on which it is assumed a thread is to be formed, Figure 3 a plan of Figure 2, and Figure 4 a right angle triangle forming the basis of the aforesaid thread.

Figure 1:
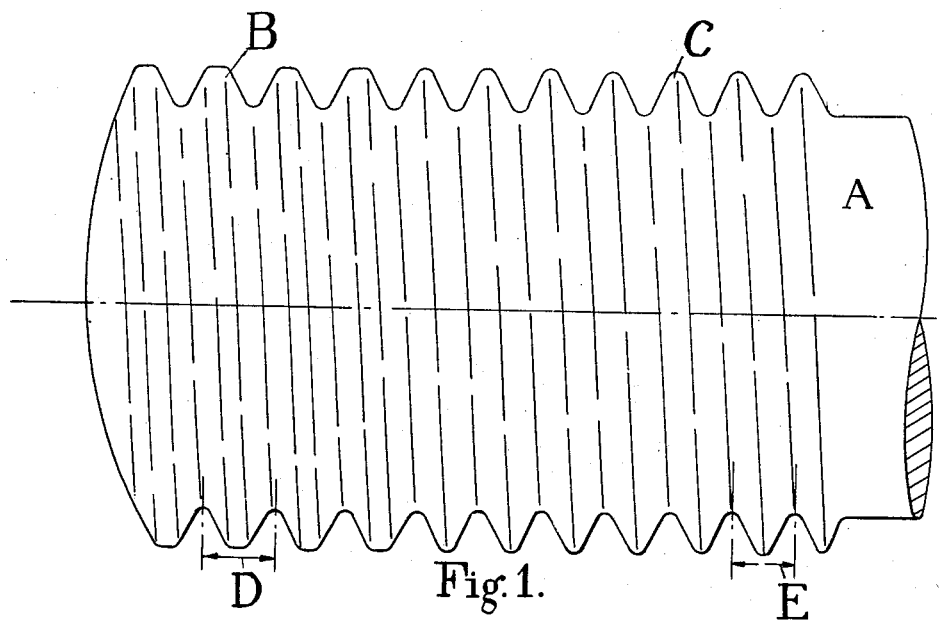
Figure 1 illustrates the preferred type of the invention in which the pitch of the thread is changed in different portions of the stud.
Figure 5:
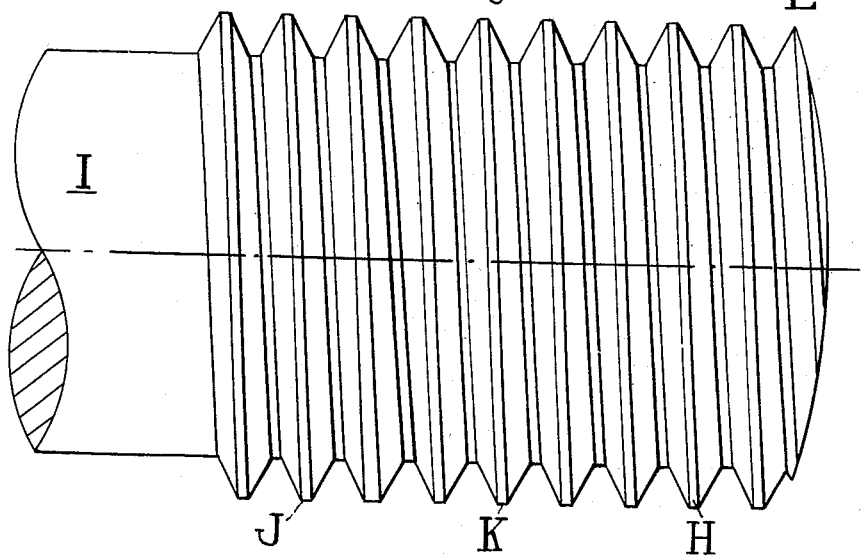

In carrying the invention into effect in accordance with the preferred form shown in Figure 1, the threaded end of a stud A is formed with two threads B and C. These threads differ in pitch, the pitch of the thread B, which is the entering end of the stud, indicated by D, being what may be termed the standard pitch for the stud, the pitch of the thread C constituting some few turns at the remote end of the stud indicated by E being less than that of the part B. In other words, it is a decreased or slower pitch so that when the stud is screwed into a crank case for example and the turns C are reached, they tend as it were to pull back the threads B which are attempting to move forward at a higher rate than the turns C. Apart from this the threads B and C are similar, that is to say, they are alike in effective diameter, outside diameter and root diameter. The change from the thread B to the thread C is made as gradually as may be and can take place over one or more revolutions or part of a revolution. The thickness of the flanks of the teeth varies to take the above factors into account.

Without regarding the theory as of the essence of the invention, it appears that by constructing a thread in the manner indicated, the loading on the teeth is better distributed than in what may be termed the normal uniform type of thread and by choice of the different pitches, and where the pitch at one end is greater than or less than the pitch of the other, the stresses in the threaded part of the stud or the like and in the crank case or the like into which the stud may be fitted are modified so that, for instance, the stud and associated parts may be placed in a condition of pre-stress which is increased when load is placed on them by bolting other parts thereto or in the circumstances of use. This prestressing can be regarded, for example, as the result of what may be termed a differential movement or stressing of the stud when it is borne in mind that because of the difference of pitch or lead the longitudinal motion for one revolution of the shank A, due to the threads B, tends to be different from that due to the threads C, so that the actual longitudinal motion is a differential motion or a compromise between the two.

Figure 2:
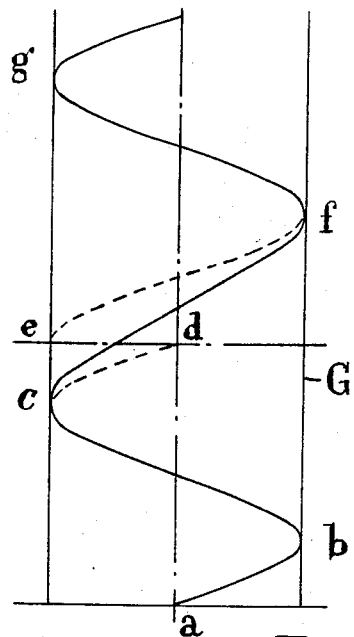

In carrying the invention into effect according to the alternative or modified arrangement referred to above, illustrated with reference to Figures 2–5, where instead of employing threads of different pitch the same thread is used but started at a different place, Figure 2 diagrammatically shows by the line abcd, which is partly full and partly dotted, the projection of the thread formed by wrapping the right angle triangle F of Figure 4 around the cylinder G of Figure 2. The various angles are marked on Figure 3 with the inner set of figures and on Figure 4. It may be assumed that the line abcd represents one of a series of threads forming the entering threaded end H of the stud I of Figure 5.

Figure 3:
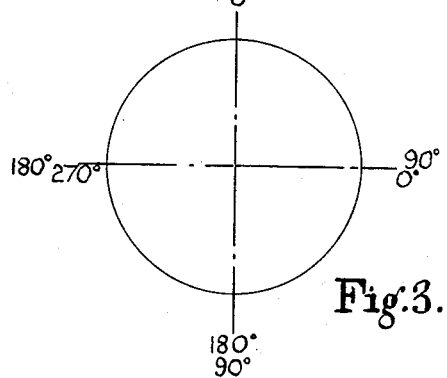

At the top of Figure 2, another thread is shown by the line efg, similar in all respects to that indicated by the line abcd, but displaced 90 degrees behind the first-mentioned thread corresponding with the outer set of figures of Figure 3. The point e is therefore 90 degrees behind the point d. This thread form efg may be taken to represent the threads at the upper part J of the stud I of Figure 5, a region K between the ends H and J representing a compromise. The two threads abcd and efg are joined by a compromise thread represented by the line cf, so that the thread as a whole is illustrated by the line abcf and g. In this way, after the threads H of the stud have entered, say, a thread stud hole in a crank case, the top threads J do not merely follow but the movement may be regarded as a compromise movement as described with reference to the main form of the invention illustrated in Figure 1.

Figure 4:
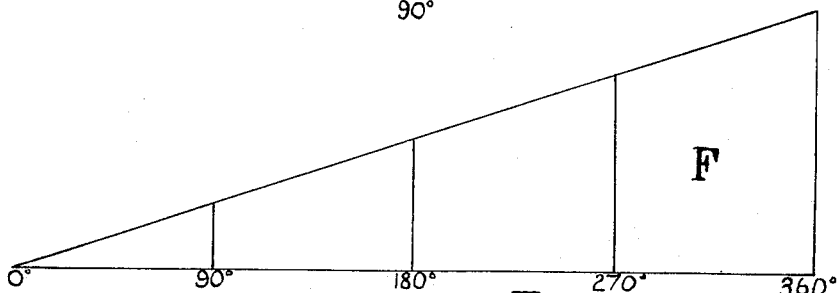

The diagrams, Figures 2 to 4, are purposely exaggerated to explain the employment of similar threads at top and bottom of the stud, which threads are displaced with reference to one another, and yet ultimately form a continuous thread. Further, a difference of start of 90° has been chosen for convenient illustration purposes but the actual degree of displacement used may be varied according to the nature of the material; it may be of any suitable amount and the following threads may be in advance of the leading threads or may lag with respect thereto.

Figure 6:
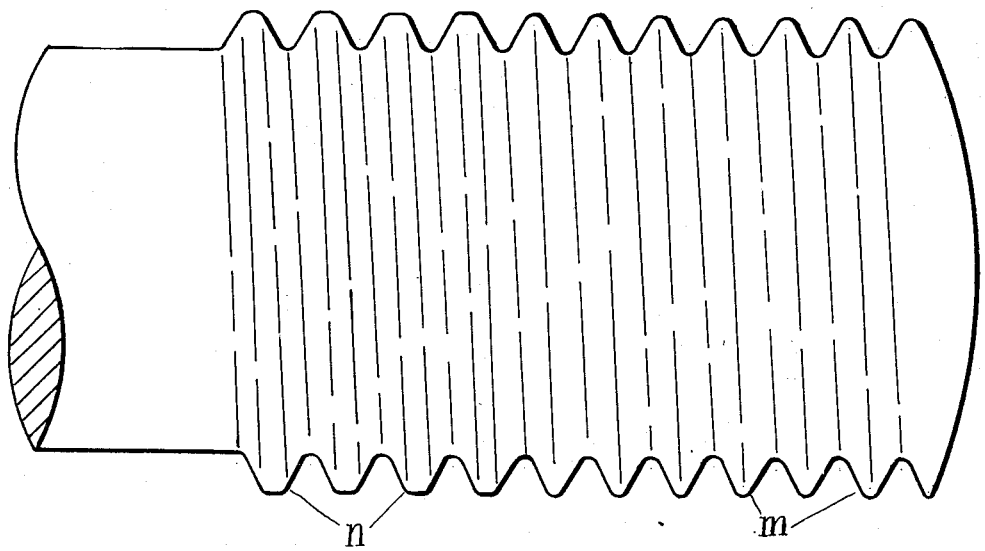
Figure 6 illustrates a threaded element embodying the present invention wherein an initial compression of the elements occurs in use.

In carrying the invention into effect according to the modification illustrated in Figure 6, as applied to an element which in use is called upon to resist longitudinal compression, we provide two threaded portions differing in pitch from each other but having common effective diameters, outside diameters and root diameters. The threaded part at the entering end m has a standard pitch whilst the threaded part n remote from the entering end has a thread whose pitch is somewhat greater than the pitch of the part m so that when the element is screwed into a screw-threaded socket of a standard thread the element is placed under condition of longitudinal compression as the threads of the part n enter. The change from the threaded part m to the threaded part n is made as gradually as may be and can take place over one or more revolutions or part of a revolution; the thickness of the flanks of the teeth varies to take the above factors into account.

Threads as described may be made in any suitable way, for instance, by using the principles of grinding or thread rolling. They may be pretensioned or compressed by lag or lead of the last few threads. The selection of pre-tension or compression depends upon the application and materials involved.

It is intended that standard nuts, that is to say, nuts with uniform thread be used with studs, bolts or the like threaded as described above.

We claim:

1. Externally-threaded elements suitable for operating in tension under load in which the pitch of the thread at the end remote from the entering end is less than the pitch of the thread at the entering end and in which the effective diameter, outside diameter and root diameter of the threaded part are constant.

2. A two-part self-locking continuous thread of constant effective diameter, constant root diameter and constant outside diameter having one part composed of a plurality of helical convolutions at a predetermined helical angle and a further part composed of a plurality of helical convolutions joined to, identical with but mismatched in relation to said former convolutions.

3. Externally-threaded elements in which the pitch of the thread at the end remote from the entering end is different from the pitch of the thread at the entering end and in which the effective diameter, outside diameter and root diameter of the threaded part are constant.

4. Externally-threaded elements suitable for operating in compression under load in which the pitch of the thread at the end remote from the entering end is greater than the pitch of the thread at the entering end and in which the effective diameter, outside diameter and root diameter of the threaded part are constant.

LEO CASPAR STEINLE.
CEDRIC HAROLD HANWELL.